Figure 1A:
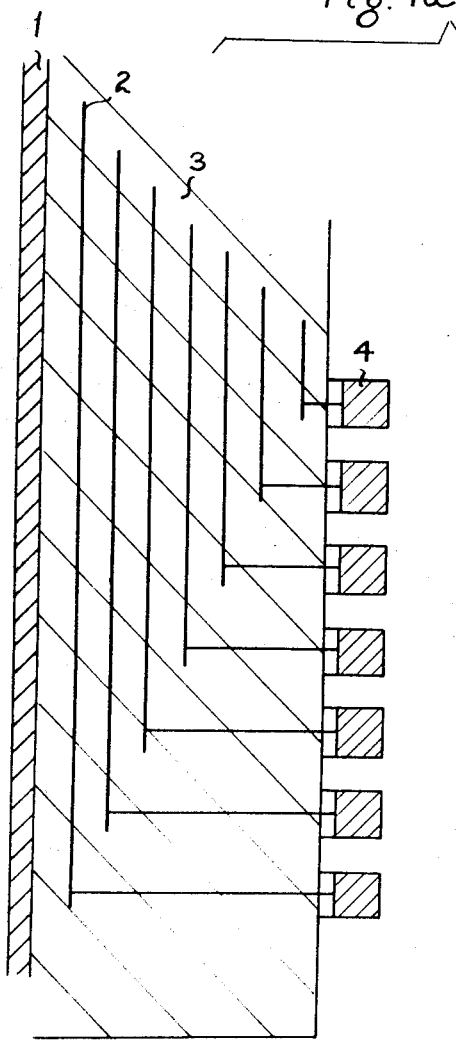
Figure 1A:
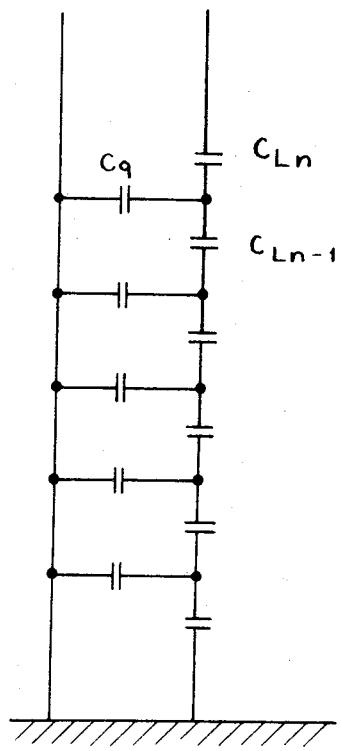

United States Patent [19]
Bossi

[11] 3,742,331
[45] June 26, 1973

[54] INDUCTIVE TYPE FIRING ARRANGEMENT FOR SERIES CONNECTED THYRISTORS IN A HIGH VOLTAGE RECTIFIER

[75] Inventor: Hans Jurg Bossi, Nussbaumen, Switzerland

[73] Assignee: Aktiengesellschaft Brown, Boveri & Cie., Baden, Switzerland

[22] Filed: Jan. 18, 1972

[21] Appl. No.: 218,845

Related U.S. Application Data

[63] Continuation of Ser. No. 24,614, April 1, 1970, abandoned.

[30] Foreign Application Priority Data

Apr. 23, 1969 Switzerland.................... 6119/69

[52] U.S. Cl............... 321/11, 321/27 R, 307/252 Q
[51] Int. Cl. ........................................... H02m 1/08
[58] Field of Search....................... 321/5, 11, 27 R; 307/252 K, 252 L, 252 M, 252 N, 252 P, 252 Q; 336/69, 70, 174, 175

[56] References Cited
UNITED STATES PATENTS 3,398,349   8/1968   Evans et al. ............................ 321/5
3,386,027   5/1968   Kilgore et al. ......................... 321/11

Primary Examiner—William H. Beha, Jr.
Attorney—Pierce, Scheffler & Parker

[57] ABSTRACT

A control column for inductive ignition of a plurality of series-connected thyristors of a high-voltage converter comprises a primary conductor at the center of a condenser bushing which is surrounded by ring-shaped iron cores connected respectively to different metallic plates included in the bushing. The cores have control windings connected respectively to the control electrodes of the thyristors and the voltage distribution on the converter is made essentially equal to the voltage distribution on the control column to prevent flow of stray displacement currents over the cores.

4 Claims, 3 Drawing Figures

$C_q << C_L$
$C_{Ln} = C_{Ln-1}$ $C_q < C_{Ln}$
$C_{Ln} > C_{Ln-1}$ $iq_1 = iq_2 = iq_n = 0$

INDUCTIVE TYPE FIRING ARRANGEMENT FOR SERIES CONNECTED THYRISTORS IN A HIGH VOLTAGE RECTIFIER

This is a continuation of application Ser. No. 24,614, filed Apr. 1, 1970.

This invention relates to a control column for the inductive ignition of a number of series-connected thyristors in high-voltage converters or rectifiers where ring-shaped iron cores which carry the control windings of the individual thyristors, surround a primary conductor insulated for the full voltage, the cores being coupled to metal plates which surround the primary conductor concentrically in the form of a condenser bushing with a continuous or separate arrangement of condenser plates.

For igniting a number of series-connected thyristors in high-voltage-converters there is generally used today a method which is known as "cable ignition". The iron cores provided with control windings for the individual thyristors are pushed over a primary conductor insulated for the full voltage. The windings of the cores are series-connected with regard to the primary conductor and a strong impulse in the primary conductor appears soon and at the same time in the control windings.

The design of the primary conductor can vary. While the cores were originally imagined simply as pulled over a cable (cable ignition), the insulated primary conductors today resemble more a bushing, for example, a condenser bushing with continuous or interrupted (telescope-like) condenser plates.

Figure 1B:
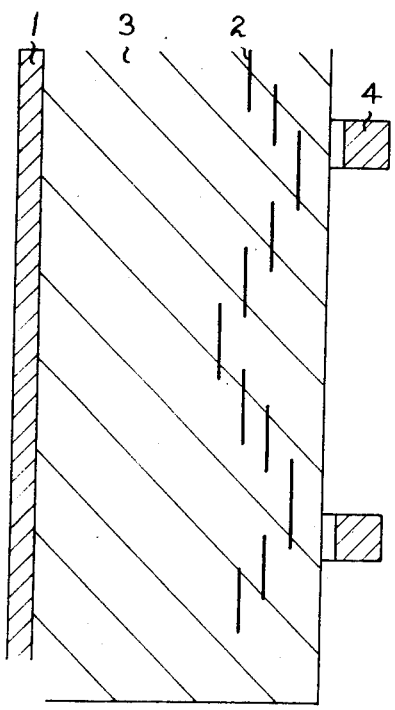
Figure 1B:
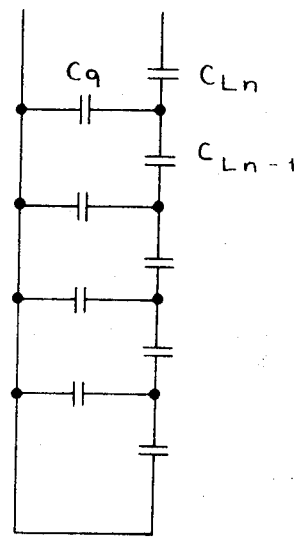

These two constructional variants are represented schematically in FIGS. 1a and 1b, the right part of each figure showing the equivalent circuits for the capacitative ratios and the necessary requirements for uniform voltage distribution in the case of the continuous condenser plates FIG. 1a, as well as of the interrupted, telescope-like plates FIG. 1b. The reference number 1 in each case designates the primary conductor, 2 the plates, 3 the insulation, 4 the cores, $C_q$ the shunt capacities and $C_{Ln}$ the longitudinal capacities.

All the above mentioned solutions have the disadvantage that considerable displacement currents flow in the stray capacities core-primary conductor and with sufficiently high $di/dt$, faulty impulses and faulty ignitions are possible. Particularly annoying is the effect when the circulation is not constant over the length of the control column. This is always the case when stray displacement currents flow from individual cores to the primary conductor or to the condenser plates.

The object of the invention is to prevent any flow of stray displacement current over the cores and to conduct the main displacement current (high voltage-ground) so that no, or only an insignificant, circulation takes place in all cores. This is achieved according to the invention in this way that the voltage distribution on the converter, given by additional capacities across the converter stages and by the building capacities against ground, and the voltage distribution on the control column shielded by the converter building block, which is given by the capacities of the condenser plates, are brought in relation to each other in such a way that the two voltage distributions are identical or substantially identical, regardless of their respective nature.

It is by no means necessary, as mentioned above, that the respective voltage distribution over the column and converter building block be uniform.

In the case of identical voltage distributions over the control column and the converter building block, no current flows over the cores on the condenser plates or primary conductor, regardless of whether the cores are coupled galvanically or capacitively to the corresponding plates. With a slight faulty distribution, however, the higher-ohmic capacitive coupling is more favorable.

Figure 2:
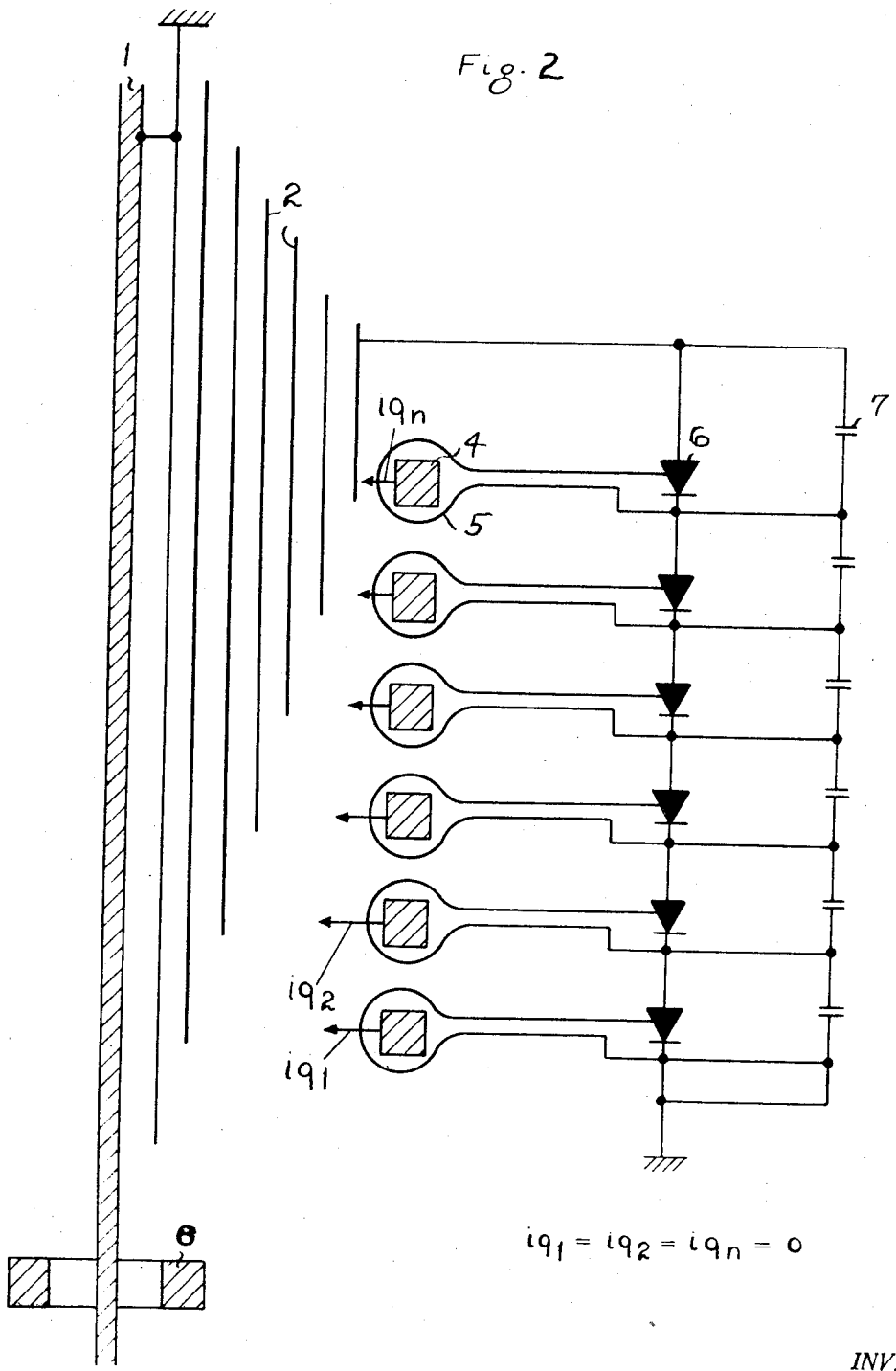

FIG. 2 shows, apart from the control column with the primary conductor 1 and the condenser plates 2, also the cores 4 with their control windings 5 and the converter with the thyristor stages 6, as well as the additional capacities 7. The capacities 7 are so selected in the sense of the invention that the voltage distributions over the column and converter are identical and that no displacement current flows over the cores 4 on the condenser plates or the primary conductor. In such case the stray displacement currents, i.e., $i_{q1} = i_{q2} = i_{qn} = 0$. A very low residual circulation is also achieved by the fact that the main displacement current is led off on the same side against ground as it is fed on the high-voltage side. Independent of the distribution of the displacement current between the plates and independent of the distribution of the conductive currents in the plates, the residual circulation in the cores is very low and faulty impulses as well as faulty ignition are practically impossible.

The effect of this measure can be further increased if the primary conductor is also connected at the end of the column on the high-voltage side to the ground, either galvanically, as shown in FIG. 2 or capacitively. The outflow of main displacement current over the end of the column not connected with the ground can be prevented additionally by providing a choke (e.g. ferrite cores 8) surrounding the conductor 1 below the condenser bushing but the consumption of control power is increased.

With the above described measures a considerable technical progress is thus achieved in the sense of a far higher voltage load capacity than it was hitherto possible. The use of condenser bushings as control columns over a 200 kV bridge voltage is thus made altogether possible.

I claim:

1. A high-voltage converter comprising a string of thyristors connected in series and having one end of said thyristor string grounded, protective capacitors connected respectively in parallel with the thyristors, and a control column for effecting inductive ignition of said thyristors, said control column comprising a rectilinear primary conductor which is grounded at one end and which is surrounded by an assembly of mutually insulated radially spaced cylindrical condenser plates, a plurality of cores surrounding and located along said control column, and secondary windings on said cores which are connected respectively to the ignition control electrodes on said thyristors, said cylindrical condenser plates being of progressively decreasing length and progressively increasing diameter as viewed in the direction radially outward from said primary conductor and said cores being spaced from each other along said control column such that the core whose secondary winding is connected to the thyristor nearest the grounded end of said thyristor string surrounds only the innermost and longest of said cylindrical condenser plates and the remainder of said cores respectively surround a progressively increasing number of condenser plates, said outermost condenser plate surrounding all of said condenser plates, and an electrical connection between said outermost condenser plate and the thyristor at the high voltage end thereof whereby to produce a voltage distribution over the string of series-connected thyristors as established by said protective capacitors and by building capacities to ground which is substantially equal to the voltage distribution between the homologous condenser plates of said control column.

2. A high-voltage converter as defined in claim 1 wherein the main displacement current between the high voltage and ground is led off on the same side of said primary conductor against ground as it is fed on the high voltage side.

3. A high-voltage converter as defined in claim 2 wherein said primary conductor at the end of the control column on the high voltage side is connected to ground through a galvanic or capacitive connection.

4. A high-voltage converter as defined in claim 3 wherein the outflow of main displacement current over the end of said primary conductor not connected to ground is additionally prevented by inclusion of a choke thereat in the form of an iron core which surrounds the conductor.

* * * * *